Jan. 15, 1963

J. B. SCHULTZ 3,073,617

INDEPENDENT VEHICLE SUSPENSION

Filed June 30, 1960

INVENTOR.
JULIUS B. SCHULTZ
BY John R. Faulkner
Clifford L. Sadler
ATTORNEYS

United States Patent Office 3,073,617
Patented Jan. 15, 1963

3,073,617
INDEPENDENT VEHICLE SUSPENSION
Julius B. Schultz, Detroit, Mich., assignor to Ford Motor Company, Dearborn, Mich., a corporation of Delaware
Filed June 30, 1960, Ser. No. 39,918
2 Claims. (Cl. 280—96.2)

The present invention relates to independent suspensions for vehicles and more particularly to a suspension system having a spring device mounted upon a wheel spindle member.

In a conventional independent front suspension, upper and lower support arms are provided with pivotal connections to the wheel spindle member. In the modern vehicle these connections are usually of the ball and socket type. A spring suspension member, usually a coil spring, is interposed between one of the arms and a bracket mounted on either the frame or body. In unit body vehicles where an integral frame is provided formed of body sheet metal, the coil spring is often positioned above the upper support arm. With such construction, wheel loads are transferred from the spindle through the ball joint to the upper arm and from there to the spring.

The present invention provides an improved independent front suspension having upper and lower support arms pivotally connected at their outer ends to a spindle member. More specifically, a ball carrying shaft is bolted at its lower end to the upper end of the spindle and has its ball member received in a socket carried by the upper arm. The shaft carrying the ball extends upwardly through the socket. The integral upwardly extending portion of the shaft rotatably supports a lower spring seat. The upper spring seat is found in the body structure member.

This construction has a significant advantage in that road loads are transferred directly from the wheel spindle to the spring seat rather than through the ball joint. Such construction greatly reduces the requirement of the ball joint's load carrying ability because the ball itself does not carry any wheel load. It merely connects the spindle to the arm and permits the wheel to turn and move up and down.

These and further objects of the present invention will become more apparent from the following description and the accompanying drawings in which.

Figure 1:
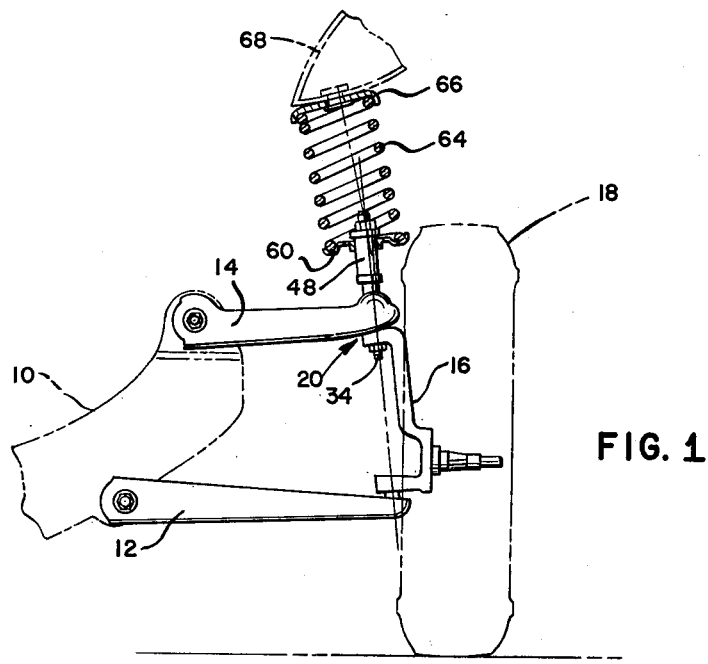
FIGURE 1 is a front elevational view of an independent front suspension for an automotive vehicle.
Figure 3:
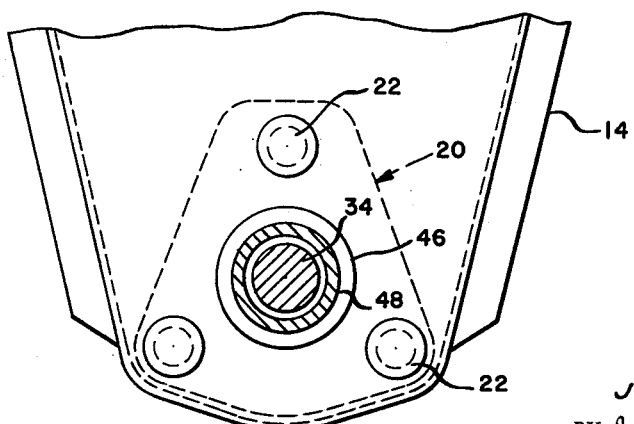
FIGURE 3 is a sectional view taken along section lines 3—3 of FIGURE 2.
Figure 2:
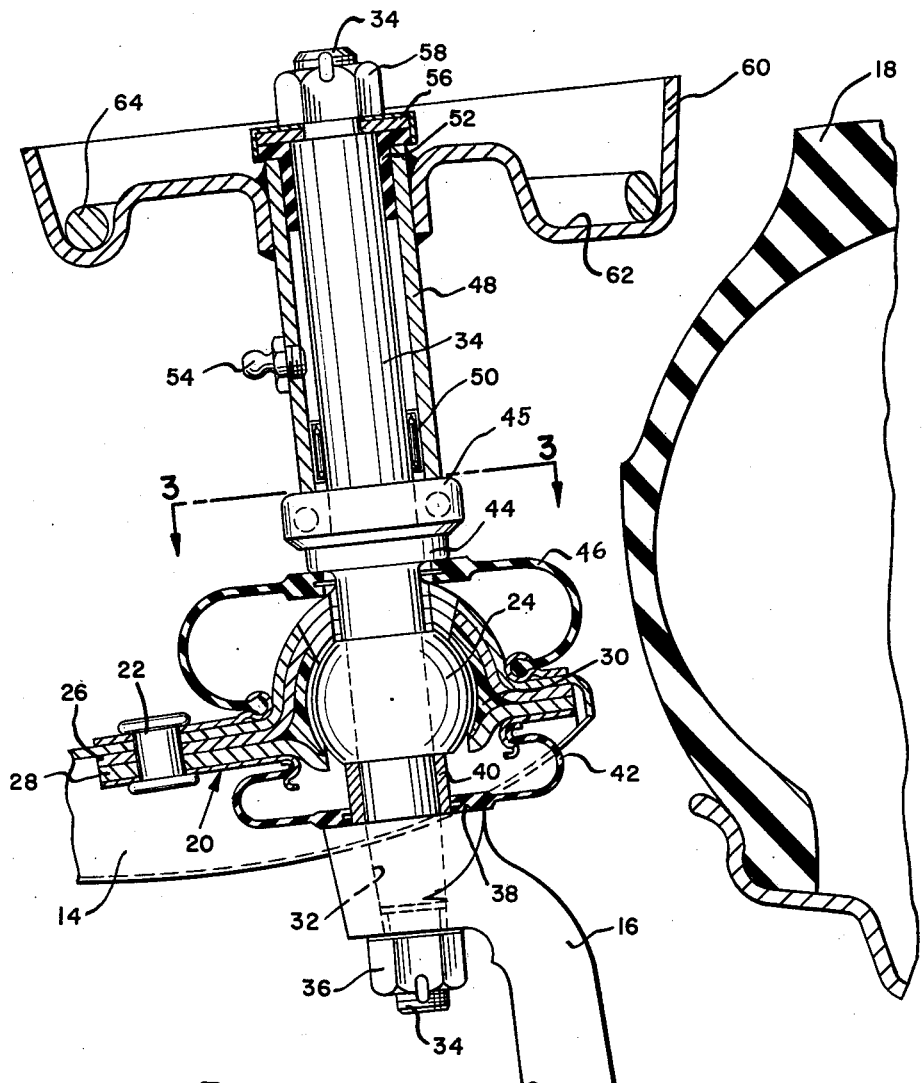
FIGURE 2 is an enlarged view partly in section of the lower spring support shown in FIGURE 1.

Referring now to the drawings for a more detailed description of the present invention, wherein like reference numerals identify like parts throughout the various views, an independent front suspension is shown in FIGURE 1. This suspension system includes a cross frame member 10 to which a lower arm 12 and an upper arm 14 are pivotally mounted at their inner ends. The outer ends of arms 12 and 14 universally support a spindle member 16 that in turn rotatably carries a road wheel 18. The lower end of spindle 16 is coupled to the lower support arm 12 by a conventional ball joint. The upper joint between spindle 16 and support arm 14 is shown in greater detail in FIGURE 2.

The outer end of arm 14 has a socket assembly 20 secured thereto by means such as rivets 22. The assembly 20 includes upper and lower socket parts 26 and 28 in which a plastic bearing member 30 is positioned. a ball member 24 is journalled within the plastic bearing 30 and is provided with a highly polished surface for low friction properties.

The upper end of the spindle member 16 is bored out at 32 to receive a shaft 34. The shaft 34 is tapered at its lower end to wedge in the bore 32 and is fitted with a nut 36 that engages threads on the exposed end of the shaft 34. The upper end of the spindle 16 is machined to a flat face 38 and a cylindrical spacer 40 is interposed between the flat surface 38 and the ball 24. A bellows-like rubber piece 42 is interposed between the upper end of the spindle 16 and the socket assembly 20 and seals off the lower end of the ball joint from dust and other contaminants.

A collar portion 44 is formed in the shaft 34 above the ball 24. It has a radial flange portion that cooperates with an upper seal 46 interposed between the flange and the socket assembly 20.

The principal purpose of collar 44 is to support an antifriction thrust bearing 45. Bearing 45 in turn carries a tubular member 48. The tubular member 48 is maintained concentrically about the shaft 34 by a needle bearing 50 and a hat shaped bushing 52. A grease fitting 54 is located in the middle of the tubular member 48 for injecting lubricant into the area of the bearings 45, 50, and 52. A flat washer 56 is secured against the bushing 52 by a nut 58 on the end of the shaft 34.

A pan-like spring seat 60 is welded to the tubular piece 48. The seat 60 has an annular recess 62 on which a coil spring 64 rests. The upper end of the coil spring 64 is supported by a bracket 66 that is secured to a portion of the vehicle body structure.

Referring to FIGURE 1 it is seen that upper and lower arms 14, 12 are pivotally connected to the frame 10 without a restricting member such as a suspension spring. Wheel loads that are imposed on the sprindle 16 are transferred directly through the shaft 34 to the thrust bearing 45 and from there to the tubular member 48 that supports the spring seat 16. With this novel structure the upper arm 14 may be constructed of lighter than usual metals as it does not carry the wheel loads normally associated with a support arm. The spindle is free to rotate relative to the upper arm 14 by reason of the ball journalled in the bearing 30. The spindle 16 with the shaft 34 attached thereto is free to rotate relative to the spring 64 and its spring seat 60 by reason of the antifriction bearings 46, 50, and 52.

Further advantages and modifications of the present invention may occur to those skilled in the art which will come within the scope of the following appended claims.

I claim:

1. A vehicle suspension system having sprung and unsprung components, a suspension arm interconnecting said components, said unsprung components including a wheel supporting spindle, the outer end of said arm having a fragmentary spherical socket, a fragmentary spherical ball journalled in said socket, a vertical shaft member extending through said ball and demountably connected to said spindle at its lower end, a collar formed on said shaft member above said ball, bearing means positioned about said shaft above said collar, a spring seat having a portion concentric about the upper end of said shaft and engaging said bearing means, said spring seat being rotatable relative to said shaft, retaining means demountably retaining said spring seat on said shaft, and a coil spring operatively interposed between said seat and said sprung component.

2. A vehicle suspension system having sprung and unsprung components, a suspension arm interconnecting said components, said unsprung components including a wheel supporting spindle, the outer end of said arm having a fragmentary spherical socket, a fragmentary spherical ball journalled in said socket, a vertical shaft member extending through said ball and connected to said spindle at its lower end, thrust bearing means positioned about said shaft above said ball, a spring seat having a portion concentric about the upper end of said shaft and engaging said thrust bearing means, said spring seat being rotatable relative to said shaft, and a coil spring operatively interposed between said seat and said sprung component.

References Cited in the file of this patent

UNITED STATES PATENTS

| | | |
|---|---|---|
| 1,849,041 | Mabrito | Mar. 8, 1942 |
| 2,290,923 | Wahlberg | July 28, 1942 |
| 2,836,413 | Hirst | May 27, 1958 |
| 2,856,198 | Muller | Oct. 14, 1958 |
| 2,876,018 | Kishline et al. | Mar. 3, 1959 |
| 2,904,343 | Taber | Sept. 15, 1959 |
| 3,007,728 | Hoffman | Nov. 7, 1961 |